United States Patent Office 2,986,546
Patented May 30, 1961

2,986,546
ADHESIVE COMPOSITIONS AND THEIR PREPARATION

Marguerite Naps, Oakland, Calif., assignor to Shell Oil Company, a corporation of Delaware No Drawing. Filed Nov. 15, 1956, Ser. No. 622,278

12 Claims. (Cl. 260—38)

This invention relates to new adhesive compositions and a method for their preparation. More particularly, the invention relates to new adhesive compositions containing phenolic resins and epoxy resins which have excellent strength and improved distensibility at elevated temperatures.

Specifically, the invention provides new and particularly useful adhesive compositions, especially adapted for bonding metals to various types of materials, comprising a methylol-containing phenol-aldehyde resin, a polyglycidyl ether of a polyhydric phenol having an epoxy equivalency greater than 1.0 and a polyvinyl acetal resin. The invention further provides new adhesive tapes comprising textile materials, and especially glass fiber textile material, impregnated with the aforedescribed composition.

There is an increasing demand in industry, and particularly in the airplane manufacturing industry, for adhesives that bond metal-to-metal, such as in preparing metal-to-metal overlaps and in preparing honeycomb sandwich structures. Polyglycidyl ethers of polyhydric phenols (e.g. commercial Epon resins) have been found to be particularly good for these applications as they give very strong bonds between metals, such as aluminum, steel and the like. The adhesives prepared from these materials, however, in some cases tend to lose their strength at the high temperatures at which many products (e.g. jet aircraft parts) are now being exposed. The addition of certain amounts of phenolic resins to the adhesive tends to improve the strength at the high temperatures, but the resulting bond then becomes quite brittle.

It is therefore an object of the invention to provide a new adhesive composition. It is a further object to provide a new adhesive composition containing epoxy resins which has excellent heat resistance as well as improved distensibility and flexibility. It is a further object to provide a new adhesive composition which is particularly adapted for bonding metals to various types of material. It is a further object to provide a new adhesive tape which is of particular value in the bonding of aluminum to aluminum. Other objects and advantages of the invention will be apparent from the following detailed description thereof.

It has now been discovered that these and other objects may be accomplished by the new compositions of the invention comprising a mixture of methylol-containing phenol-aldehyde resin, a polyglycidyl ether of a polyhydric phenol having an epoxy equivalency greater than 1.0, a polyvinyl acetal resin and an epoxy hardening agent. It has been found that when these compositions are placed between two surfaces, and particularly metal surfaces, and subjected to curing temperature they form very strong bonds which have unexpectedly high heat resistance and good flexibility and distensibility at high temperatures. Evidence of the unexpected superiority of the new compositions, especially as to heat resistance and flexibility at high temperatures is presented in Example I at the end of the specification.

The glycidyl polyethers of polyhydric phenols used in preparing the new compositions of the present invention are obtainable by reacting a polyhydric phenol with epichlorohydrin in basic medium at about 50° C. to 150° C. with use of more than one mole of epichlorohydrin per equivalent of phenolic hydroxyl group of the phenol and a slight stoichiometric excess of base such as about 2% to 30% excess sodium or potassium hydroxide. The reaction is effected by heating for several hours and the product is then separated from formed salt, excess base, and any unreacted epichlorohydrin. It is usually preferred to employ glycidyl polyethers of a dihydric phenol in the invention, which product, instead of being a single simple compound, is generally a complex mixture of glycidyl polyethers, but the principal product may be represented by the formula

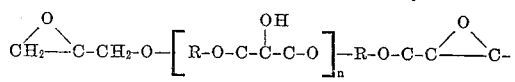

wherein $n$ is an integer of the series 0, 1, 2, 3 . . ., and R represents the divalent hydrocarbon radical of the dihydric phenol.

Any of the various polyhydric phenols may be used in preparing the polyethers including mononuclear phenols such as resorcinol, catechol, hydroquinone, methyl resorcinol, etc.; or polynuclear phenols like 2,2-bis(4-hydroxyphenyl)propane which is termed bis-phenol herein for convenience, 4,4'-dihydroxybenzophenone,
bis(4-hydroxyphenyl)methane,
1,1-bis(4-hydroxyphenyl)ethane,
1,1-bis(4-hydroxyphenyl)isobutane,
2,2-bis(4-hydroxyphenyl)butane,
2,2-bis(4-hydroxy-2-methylphenyl)propane,
2,2-bis(4-hydroxy-2-tertiary-butylphenyl)propane,
2,2-bis(2-hydroxynaphthyl)pentane,
1,5-dihydroxynaphthalene, etc., as well as more complex polyhydric phenols such as pyrogallol, phloroglucinol and novolac resins from condensation of a phenol with an aldehyde in the presence of an acidic condensation catalyst. Preparation of glycidyl polyether of novolac resin is described in Example 27 of German Patent No. 676,117.

Preferred glycidyl polyethers are the glycidyl polyethers of 2,2-bis(4-hydroxyphenyl)propane having a molecular weight of about 800 to 4000 as is the case when $n$ is about 3 to 13 in the above-described structural formula.

The glycidyl polyethers will be better understood from consideration of the following described preparation and properties of one of the products. The parts are by weight.

POLYETHER A 1 mol of 2,2-bis(4-hydroxyphenyl)propane and 1.88 mols of sodium hydroxide as a 10% aqueous solution were combined and heated to about 45° C. whereupon 1.57 mols of epichlorohydrin was added rapidly. The temperature increased and remained at about 95° C. for 80 minutes. The mixture separated into a two-phase system and the aqueous layer is drawn off. The resinous layer that remained is washed, drained and dried. The resulting product had a melting point of about 70° C., a molecular weight of 900 and an epoxide value of 0.20 eq./100 g.

POLYETHER B

This glycidyl polyether was obtained in like manner to that of Polyether A except that for every mol of bisphenol there was employed 1.22 mols of epichlorohydrin and 1.37 mols of sodium hydroxide. The resulting product had a melting point of 98° C., a molecular weight of 1400 and an epoxide value of 0.103 eq./100 g.

The glycidyl polyethers of polyhydric phenols are also referred to as "ethoxyline" resins. Chem. Week 69, 27 (1951).

The glycidyl ethers are sometimes defined in terms of "epoxy equivalency." The meaning of this term is described in U.S. 2,633,458.

The second component in the compositions of the invention is a methylol-containing phenol-aldehyde resin. These are often called "A-stage," "one-stage" or "resole" resins and are obtained by reacting phenols with an excess of formaldehyde in the presence of an alkaline catalyst. A description of these resins and methods for their preparation may be found in "The Chemistry of Phenolic Resins" by Martin, pages 88 to 97.

In preparing these methylol-containing phenol-aldehyde resins one may use a monohydric, polyhydric, mononuclear or polynuclear phenol, such as, for example, phenol, cresol, xylenol, cardanol, naphthol, diphenol, diphenylolmethane, diphenylolpropane, resorcinol, and the like. Furthermore, while it is preferred that the phenolic resin be derived from formaldehyde, the resin may have resulted from condensation of phenol with other aldehydes, such as, for example, acetaldehyde, isobutyraldehyde, 2-ethylhexaldehyde, acrolein, crotonaldehyde, furfural, benzaldehyde, and the like.

The preferred methylol-containing phenol-aldehyde resins to be used in the preparation of the compositions of the invention are the liquid resins possessing more than 1 methylol group and being prepared from formaldehyde and a monohydric or polyhydric phenol containing not more than 20 carbon atoms.

The other essential ingredient of the compositions of the invention is a polyvinyl acetal resin. These resins are acetals from reaction of an aldehyde and polyvinyl alcohol, which alcohol is normally derived from polyvinyl acetate. Many polyvinyl acetal resins are commercially available. Thus, a resin sold under the name of Formvar 15/95E (Shawinigan Resins Corporation) is a product derived from polyvinyl acetate and is made by replacing 95% of the acetal groups by formal groups from formaldehyde, the original polyvinyl acetate being a substance which gives a benzene solution of 86 grams per liter having a viscosity of 15 centipoises at 20° C. Similarly a resin known as Alvar 5/80 (Monsanto Chemical Company) is a product derived from polyvinyl acetate wherein there is an 80% replacement of acetyl groups by acetal groups and the original polyvinyl acetate had a viscosity of 5 centipoises at 20° C.

Any polyvinyl acetal resin can be used in the composition of the invention although it is preferred that the material be a polyvinyl acetal resin of an alkanal of 1 to 4 carbon atoms. It is also preferred that the resin be derived from polyvinyl acetate with from 50% to 100% of the acetyl groups replaced with alkanal groups (alkylidene groups) of an alkanal of 1 to 4 carbon atoms, which polyvinyl acetal resin has a molecular weight of about 20,000 to 100,000. In all cases, the polyvinyl resins are thermoplastic resins.

Particularly preferred polyvinyl acetal resins are the polyvinyl formal resins having 70% to 98% of acetyl groups replaced with formal groups and having a molecular weight between 20,000 and 80,000.

The above-noted components must be combined in controlled proportions in order to obtain the desired properties. The glycidyl polyether should be added in amount varying from 20 to 60% of the combined weight of epoxy resin and phenol-aldehyde resin, and preferably in amounts varying from 25% to 45% of the combined weight. The phenol-aldehyde resin should be added in amounts varying from 45% to 80% of the combined weight of epoxy resin and phenol-aldehyde resin, and preferably in amounts varying from 50% to 70% of the combined weight.

The polyvinyl acetal resin should be added in amounts of at least 7.5 and more preferably in amounts of 10 to 40 parts per hundred parts of the combined weight of glycidyl polyether and phenol-aldehyde resin. The above-noted superior results are especially apparent when the polyvinyl acetal is used in amounts of from 12 to 35 parts.

The compositions of the invention may be prepared by a variety of methods. If the glycidyl polyether is a solid, it is preferred to first melt the ether by heating say to about 100° F. to 200° F. and then adding the methylol-containing phenol-aldehyde resin thereto. The polyvinyl acetal resin may then be added to the mixture of the glycidyl polyether and phenol-aldehyde resin. While the glycidyl polyether and phenol-aldehyde resin is essentially a homogeneous mixture, the addition of the polyvinyl acetal resin in the amounts noted above gives a heterogeneous mixture because of the low compatibility of the acetal resins with this mixture. This heterogeneity, however, does not destroy the above-noted superior properties of the claimed compositions.

To obtain the desired properties one should employ a reinforcing filler, such as aluminum powder, asbestos, powdered mica, zinc dust, bentonite, ground glass fibers, Monetta clay and the like. These fillers are preferably used in amounts varying from 10 parts to 200 parts per 100 parts of the glycidyl polyether and the phenol-aldehyde resin.

The adhesive compositions of the invention may also be prepared in solution. Volatile solvents which may escape from the compositions are particularly preferred. Examples of these include, among others, ketones like acetone, methyl ethyl ketone, methyl isobutyl ketone, isophorone, etc.; esters, such as ethyl acetate, butyl acetate, Cellosolve, acetate (ethylene glycol monoacetate), methyl Cellosolve acetate; ether alcohols, such as a methyl, ethyl or butyl ether of ethylene glycol or diethylene glycol; chlorinated hydrocarbons such as trichloropropane, chloroform, etc. To save expense, these active solvents may be used in admixture with aromatic hydrocarbons, such as benzene, toluene, xylene and the like. Other solvents include liquid monoepoxy compounds, including glycidyl allyl ether, glycidyl phenyl ether, styrene oxide, cyano-substituted hydrocarbon, such as acetonitrile, propionitrile, adiponitrile, benzonitrile, and the like.

The mixture of glycidyl polyether and methylol-containing phenol-aldehyde resin can be cured by application of heat. However, the use of epoxy curing agents is desirable as it gives faster cure and improved adhesive strength. If the adhesive composition is prepared in the form of a hot melt, the preferred curing agents are the alkaline curing agents, such as dicyandiamide and diaminodiphenylsulfone. In a solvent system, preferred curing agents are the acidic and basic curing agents, such as meta-phenylenediamine, diaminopyridine, dicyandiamide, diaminodiphenylsulfone, melamine, 1,4-diaminocyclohexane, adducts of polyamines and monoepoxies; and acidic materials, such as phosphoric acid, butyldihydrogen phosphate, phthalic anhydride, benzenedisulfonic acid, and the like. The curing agents are preferably used in amounts varying from 1% to 100% based on the weight of the glycidyl polyether, and still more preferably in amounts varying from 2% to 75% based on the weight of the glycidyl polyether.

Various other materials may be added to the compositions of the invention, such as pigments, stabilizers, plasticizers, and other resins including urea-formaldehyde resins, furfural resins and the like.

The temperature used in the final curing of the compositions will vary depending upon the glycidyl polyether selected and the type of curing agent. In general, temperatures of 100° C. to 200° C. are sufficient to effect the cure. Particularly preferred temperatures for use with the preferred compositions containing the diglycidyl ether of 2,2-bis(4-hydroxyphenyl)propane, the methylol-containing phenol-formaldehyde resin and polyvinyl formal with an amine, such as dicyandiamide as curing agent, range from about 130° C. to 175° C.

As noted above, the compositions of the invention are particularly suited for use as adhesives. They may be used in the bonding of a great variety of materials, such as metal-to-metal, metal to other materials, such as plastic, wood-to-wood, glass-to-glass, glass-to-metal, and the like. They are of particular value, however, in the bonding of metals such as the aluminum-to-aluminum and steel-to-steel. When applied as an adhesive, the compositions may simply be spread on the desired surface to form films of various thicknesses, e.g. 5 mils to 30 mils, and then the other surface superimposed and heat applied. Curing pressures can be light contact pressure or up to 200 p.s.i.

When the compositions are used as adhesives for metal-to-metal bonding, it has been found advantageous to impregnate cotton, rayon, synthetic fiber or glass cloth textiles with the compositions, and then use the impregnated textiles as a bonding tape for joining the metals. Such tapes provide convenient means for handling and using the compositions in adhesive applications. The tape is inserted between two metals desired to be joined, and the assembly is heated and baked to cure the resin whereby articles are obtained wherein the joined surfaces have not only excellent strength at ordinary temperature, but also retain good strength even though heated at quite elevated temperatures for long periods of time. A preferred tape for such use had a glass fiber textile impregnated with a mixture containing in parts by weight: about 50 to 75 parts of an A-stage condensate of phenol with formaldehyde, about 25 to 50 parts of a glycidyl polyether having an epoxide equivalent weight of about 300 to 700, about 50 to 150 parts of atomized aluminum powder or dust (preferably finer than 100 mesh), about 2 to 10 parts of dicyandiamide, and about 20 parts of polyvinyl formal.

In addition to their use as adhesives, the new compositions may also be used for filling voids, as foams, as protective coatings, and in the fabrication of articles for manufacture.

The invention is illustrated in the following examples, but is not to be construed as limited to details described therein. The parts and percentages are by weight unless otherwise indicated.

*Example I*

33 parts by weight of Polyether A described above was melted at 175° F. to 190° F. and 67 parts by weight of a methylol-containing phenol-formaldehyde resin added thereto with stirring and gradual increase of temperature to 210° F. This phenolic resin was a liquid having the following analysis:

Water, percent wt. _____ 16.5
Free phenol, percent wt. _____ 2.5
pH _____ 8.5
Viscosity in centipoises, 77° F. _____ 8,700
Methylol value, equiv./100 g. _____ 0.68
Carbonyl value, equiv./100 g. _____ 0.133

100 parts of aluminum dust and 15 parts by weight of a polyvinyl formal resin (Formvar 15/95E) was added thereto with stirring. 6 parts of dicyandiamide was added as a curing agent. The resulting composition is a viscous paste at 190° F. and appears as a rather heterogeneous mixture. At room temperature the mixture is a soft solid.

The above composition was spread at about 190° F. on two clean aluminum sheets heated to about 250° F. The coated sheets were joined and baked for 30 minutes in an oven set at 330° F. in order to cure the adhesive. The bonds were tested in tensile shear at various temperatures as described in U.S.A.F. specification MIL-8331. The initial shear strength was 2900 pounds per square inch (at 77° F.) and the shear strength at 500° F. was 1400 pounds per square inch. A related adhesive prepared only from Polyether A and the phenolic resin had shear strength values of 2180 p.s.i. at 75° F. and 1430 p.s.i. at 500° F.

These results clearly demonstrate the excellent heat resistance of the above-described adhesive. The extensibility and toughness of the joint is reflected by the so-called bend strength tests determined according to the method described in specification MIL-8331. The above-described adhesive had a bend strength of 158 pounds while a related adhesive without the Formvar had a bend strength of only 112 pounds.

The above experiment was repeated with the exception that the amount of the polyvinyl formal was changed to 10 parts and 30 parts. In each case, the resulting adhesive had excellent heat and bend resistance.

*Example II*

40 parts of Polyether B described above was melted at 200° F. and 60 parts of the methylol-containing phenol-formaldehyde resin described in Example I was added thereto with stirring and gradual increase of the temperature to 210° F. 100 parts of aluminum dust and one part copper 8-quinolinolate which acts as a heat stabilizer and 15 parts of a polyvinyl formal resin (Formvar 15/95E) was added thereto with stirring. 6 parts of dicyandiamide was added as a curing agent. The resulting composition is a viscous paste at 200° F. and appears as a heterogeneous mixture.

The above composition was applied to two clean aluminum sheets heated to about 250° F. to facilitate spreading. The coated sheets were joined and baked for 30 minutes in an oven set at 330° F. in order to cure the adhesive. The resulting adhesive had good tensile shear strength and bend strength even after 200 hours of heating at 500° F.

*Example III*

35 parts of Polyether A described above was melted and 65 parts of a methylol-containing phenol-formaldehyde resin added thereto with stirring. This phenolic resin was a liquid having the following analysis:

Methylol value, equiv./100 g _____ 1.01
Carbonyl value, equiv./100 g _____ 0.352
pH _____ 7.4
Water, percent wt_____ 1.1
Viscosity at 77° F_____ 7,300

100 parts of aluminum dust and 20 parts of polyvinyl formal resin (Formvar 15/95E) was added thereto with stirring. 6 parts of dicyandiamide was added as a curing agent. The resulting composition was a viscous paste at 190° F. and appeared to be a heterogeneous mixture.

Glass fabric grade 112 with Volan A finish was impregnated with the warm adhesive paste. The resulting supported adhesive tape was allowed to cool to ambient temperature and inserted between two clean aluminum sheets (clad aluminum alloy 2024-$T_3$) to form a single one-half inch lap joint. The assembly was heated in a press at 100 p.s.i. for one-half hour at 330° F. The resulting bond had good tensile shear strength and bend strength.

Related results are obtained by replacing the Formvar resin with equal amounts of each of the following: a polyvinyl butyral resin having a molecular weight of about 30,000 and a polyvinyl acetal resin having a molecular weight of about 40,000.

*Example IV*

36 parts of Polyether A was melted as in Example I and 67 parts of a liquid methylol-substituted phenol formaldehyde resin added thereto with stirring. This phenolic resin had the following analysis:

Viscosity at 77° F_____centipoises___ 4260
Water, percent wt_____ 11.2
pH _____ 8.0
Specific gravity _____ 1.2436
Methylol value, eq./100 g_____ 0.55
Carbonyl value, eq./100 g_____ .07

100 parts of aluminum dust, 20 parts of polyvinyl formal (Formvar 15/95E), 1 part of cupric 8-quinolinolate and 6 parts of dicyandiamide were added to the above mixture with stirring. The resulting composition is a viscous paste at 190° F. and appears as a rather heterogeneous mixture.

A supported adhesive tape with glass fabric 112-Volan A was prepared from the above composition by the method shown in Example III. The adhesive strength test data is as follows:

|  | Adhesive with Formvar | Adhesive without Formvar |
|---|---|---|
| Shear strength at 77° F., p.s.i. | 3,300 | 2,310 |
| Shear strength at 260° F., p.s.i. | 2,280 | 2,245 |
| Bend strength at 77° F., pounds | 163 | 131 |

The indicated increase in bend strength and shear strength at 77° C. illustrates the increase in toughness and peel resistance of the bond with little sacrifice in shear strength at the higher temperatures.

Example V 33.3 parts of Polyether A was dissolved in 396 parts of a solvent (10/1 methyl isobutyl ketone and n-butanol) and 66.6 parts of the liquid methylol-containing phenol-formaldehyde resin described in Example I and 16 parts of polyvinyl butyral (Butvar B-76) added thereto.

The above solution was applied directly to clean steel surfaces and then dried at mild temperature to remove solvent. The joint is then assembled and cured for one-half to one hour at 350° F. The joint has improved peel strength compared to a similar adhesive containing no Butvar B-76.

Example VI 1.8 parts of dicyandiamide is dissolved in 66.6 parts of the liquid methylol-containing phenol-formaldehyde resin described in Example IV without application of heat. This mixture is then mixed with a resinous solution of 11.1 parts of polyvinyl formal (Formvar 12/85T) in tetrahydrofuran and 33.3 parts of Polyether A in methyl isobutyl ketone. The resulting mixture is a clear slightly viscous solution.

This adhesive is useful for preparing aluminum honeycomb structures; the cell walls are formed by joining the two aluminum surfaces at the desired areas. The honeycomb was high compressive strength which is retained at elevated temperatures because of the excellent hot strength of the adhesive.

Example VII 33 parts of Polyether A was melted as in Example I and 67 parts of a liquid methylol substituted phenol formaldehyde resin as described in Example I added thereto with stirring. 100 parts of aluminum dust, 1 part of cupric 8-quinolinolate and 6 parts of dicyandiamide were added to the above mixture with stirring.

Glass fabric, 112–Volan A, was impregnated with the above composition which had been heated to 190° F. During this process, 15 parts of polyvinyl formal (Formvar 15/95E) was added to the melt. Thickness of the supported tape was 18 mils. A one-half inch lap join to clad 2024-T$_3$ aluminum alloy had the following properties:

|  | Adhesive with Formvar | Adhesive without Formvar |
|---|---|---|
| Shear strength at 77° F., p.s.i. | 2,735 | 2,300 |
| Bend strength, lbs. | 150 | 130 |

I claim as my invention:

1. An adhesive composition comprising a mixture of 20 to 60 parts of a glycidyl polyether of a polyhydric phenol having an epoxy equivalency between 1.0 and 2.0 and a molecular weight between 800 and 4000, 40 to 80 parts of a methylol-containing phenol-aldehyde resin and from 7.5 parts to 40 parts per 100 parts by weight of the mixture of glycidyl polyether and phenol-aldehyde resin of a polyvinyl acetal resin of an alkanol of 1 to 4 carbon atoms, said polyvinyl acetal resin having a molecular weight between 20,000 and 100,000.

2. A composition as defined in claim 1 wherein the polyvinyl acetal is a polyvinyl formal which is used in amounts varying from 10 parts to 40 parts per 100 parts by weight of the mixture of glycidyl ether and phenolic resin.

3. A composition as defined in claim 1 wherein the polyvinyl acetal is a polyvinyl butyral.

4. A composition as in claim 1 wherein the polyvinyl acetal is a polyvinyl formal derived from polyvinyl acetate wherein from 70 to 95% of the acetyl groups have been replaced by formal groups.

5. A composition as in claim 1 wherein the methylol-containing phenol-aldehyde resin is an A-stage reaction product of phenol and formaldehyde which is a liquid and has a methylol value of at least 0.10 eq./100 g.

6. A composition as in claim 1 wherein the glycidyl polyether is a glycidyl polyether of 2,2-bis(4-hydroxyphenyl)propane having a molecular weight between 500 and 1500.

7. A composition as in claim 1 wherein the composition also contains an aluminum powder filler.

8. An adhesive composition comprising a heterogeneous mixture of 25 to 50 parts of a glycidyl polyether of a dihydric phenol having an epoxy equivalency between 1.0 and 2.0 and having a molecular weight between 500 and 1,500, 50 to 75 parts of a liquid methylol-containing phenol-aldehyde resin, 10 parts to 40 parts (per 100 parts of polyether and phenolic resin) of a polyvinyl formal resin having a molecular weight between 10,000 and 80,000, 30 to 200 parts (per 100 parts of polyether and phenolic resin) of an inert filler, and 1% to 30% (by weight of the polyether) of an alkaline epoxy curing agent of the group consisting of dicyandiamide, diaminodiphenylsulfone, metaphenylenediamine, diaminopyridine, melamine, 1,4-diaminocyclohexane and adducts of polyamines and monoepoxides.

9. An adhesive as in claim 8 wherein the filler is aluminum powder.

10. An adhesive as in claim 8 wherein the curing agent is dicyandiamide.

11. As an article of manufacture, a tape comprising a textile impregnated with a mixture comprising a mixture of 20 to 60 parts of a glycidyl polyether of a polyhydric phenol having an epoxy equivalency between 1.0 and 2.0 and a molecular weight between 800 and 4000, 40 to 80 parts of a methylol-containing phenol-aldehyde resin, 7.5 parts to 30 parts (per 100 parts of a mixture of polyether and phenolic resin) of a polyvinyl acetal resin of an alkanal of 1 to 4 carbon atoms, said polyvinyl acetal resin having a molecular weight between 20,000 and 100,000 and an epoxy curing agent of the group consisting of dicyanadiamide, diaminodiphenylsulfone, metaphenylenediamine, diaminopyridine, melamine, 1,4-diaminocyclohexane and adducts of polyamines and monoepoxides.

12. As an article of manufacture, a tape comprising a glass fiber textile impregnated with the composition defined in claim 8.

References Cited in the file of this patent

UNITED STATES PATENTS

| 2,521,911 | Greenlee | Sept. 20, 1950 |
| 2,713,565 | Howard et al. | July 19, 1955 |
| 2,920,990 | Been et al. | Jan. 12, 1960 |

FOREIGN PATENTS

| 251,647 | Switzerland | Sept. 1, 1948 |

OTHER REFERENCES

Charlton: "Alloying with Epoxies," Modern Plastics, vol. 32, No. 1, September 1954, page 161.

Black et al.: "Metal Bonding Adhesive With Improved Heat Resistance," Modern Plastics, December 1954, pp. 139–147 and 237.